(12) United States Patent
Nambu et al.

(10) Patent No.: US 6,364,992 B1
(45) Date of Patent: *Apr. 2, 2002

(54) DECORATIVE SHEET AND PROCESS FOR PRODUCING THE SAME

(75) Inventors: Yoshihiko Nambu; Hiroyuki Tomomatsu, both of Tokyo (JP)

(73) Assignee: Riken Vinyl Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,187

(22) PCT Filed: Jun. 3, 1996

(86) PCT No.: PCT/JP96/01496

§ 371 Date: Feb. 2, 1998

§ 102(e) Date: Feb. 2, 1998

(87) PCT Pub. No.: WO97/46382

PCT Pub. Date: Dec. 11, 1997

(30) Foreign Application Priority Data

Dec. 5, 1994 (JP) .............................................. 6-301190

(51) Int. Cl.[7] .......................... B32B 27/20; B32B 27/00; B32B 33/00; B32B 31/12

(52) U.S. Cl. ....................... 156/277; 428/201; 428/204; 428/205; 428/207

(58) Field of Search ................................. 428/195, 201, 428/202, 204, 207, 205; 156/277

(56) References Cited

U.S. PATENT DOCUMENTS

| | | | | |
|---|---|---|---|---|
| 4,268,127 A | * | 5/1981 | Oshima et al. | 350/337 |
| 4,756,951 A | * | 7/1988 | Wang et al. | 428/204 |
| 5,246,765 A | * | 9/1993 | Lussi et al. | 428/203 |
| 5,746,857 A | * | 5/1998 | Murata et al. | 156/102 |

FOREIGN PATENT DOCUMENTS

| | | | |
|---|---|---|---|
| JP | 59-190847 | | 10/1984 |
| JP | 59-229336 | | 12/1984 |
| JP | 1-166950 | * | 6/1989 |
| JP | 1-166958 | * | 6/1989 |
| JP | 2-78546 | | 3/1990 |
| JP | 5-104692 | * | 4/1993 |
| JP | 6-79830 | * | 3/1994 |

* cited by examiner

*Primary Examiner*—Curtis Mayes
(74) *Attorney, Agent, or Firm*—Sughrue Mion, PLLC

(57) ABSTRACT

A decorative sheet is characterized in that the sheet comprises a thermoplastic resin layer (A), an adhesive layer containing a luster pigment (B) and a transparent or translucent thermoplastic resin layer (C) laminated in the order mentioned. According to the present invention, a decorative sheet which exhibits cost saving and enhanced designability and a process for producing the sheet are provided.

11 Claims, 1 Drawing Sheet

DECORATIVE SHEET AND PROCESS FOR PRODUCING THE SAME

TECHNICAL FIELD

The present invention relates to decorative sheets and to a process for their production. In particular, it relates to a decorative sheet that offers cost savings and enhanced designability and to a process for the production of such a sheet. The decorative sheet according to the present invention is suitable for lamination over the surfaces of substrates such as steel plates, plywood laminates, aluminum plates and the like and hence is applicable, especially to household appliances, interior architectural materials, exterior architectural materials and the like, as a highly designable decorative sheet.

BACKGROUND ART

In recent years, luxury class household appliances, acoustic devices, room heaters, interior architectural materials, exterior architectural materials and the like have become popular. Therefore, the demand for a high level of designability, particularly, a metal-toned appearance to be imparted to decorative sheets for use in these products has arisen.

A certain method has heretofore been practiced to give a decorative sheet metallic toning in which a printing is performed on a substrate film or sheet by use of an ink containing a luster pigment such as brass, aluminum, mica, pearl or the like.

Japanese Patent Publication No. 61-51988, for instance, discloses a polyester film-covered metal sheet which is obtained by printing a pattern on an inner surface of a transparent or translucent polyester film by use of a metallic pigment-containing ink, followed by adhesion of the resulting film to a mild steel sheet or the like.

However, this conventional metal sheet is, though easily producible, disadvantageous in that the pigment is necessarily made with a small particle diameter. Consequently, there is limited irregular reflection of the light rays incident upon the pigment resulting in a printed pattern that is rather planar, less stereoscopic, less deep, deficient in metallic toning and insufficient with respect to designability.

Moreover, a decorative sheet provided with a metal sheet layer has been proposed. In Japanese Utilitly Model Laid-Open No. 63-154219, for example, a covered metal plate which is derived by laminating a metal plate with a decorative sheet having a biaxially oriented polyethylene terephthalate layer, a resin layer, a metal sheet layer, another polyethylene terephthalate layer and an amorphous polyethylene terephthalate layer superimposed one on another in the above order is disclosed.

However, despite its good metallic toning this metal plate is defective in that since it has a multi-layered structure as mentioned above, it is tedious and costly to produce.

A certain laminated sheet has also been proposed which results from lamination of a metallic pigment-containing thermoplastic resin layer with a polystyrene layer. For example, Japanese Patent Laid-Open No. 51-151742 discloses a composition derived by kneading polystyrene, ethylene-vinyl acetate copolymer, styrene-butadiene rubber and a specific type of pearl pigment, and a laminated sheet of said composition and polystyrene.

This laminated sheet has good metallic toning, but requires two different process steps to be effected: first, to prepare a composition; next, to laminate same as noted above and thus entails tedious and time-consuming procedures. Further, the pearl pigment needs to be uniformly incorporated in a large amount into, a thermoplastic resin which increases the cost.

In addition to the foregoing prior art, a metallic foil-laminated polyester film, a metal-deposited film and the like have been proposed in order to develop a metallic tone. While excelling in metallic toning, these films have a drawback in that a metal-foil layer or metal-deposited layer invites surface crazing during post-molding such as of bending or elongation of the film. The metal-deposited film has another problem in that it tends to cause a decline in adhesive strength making it insufficient at the interfacial boundary between the metal-deposited layer and the mating film.

The object of the present invention is to solve the aforementioned problems of the prior art and to provide a decorative sheet that offers low cost and excellent designability, and also to provide a process for the production of such sheet.

DISCLOSURE OF THE INVENTION

As a result of their intensive research, the present inventors have successfully avoided the above problems that have arisen in the prior art.

Namely, the present invention provides a decorative sheet characterized in that the sheet comprises a thermoplastic resin layer (A), an adhesive layer containing a luster pigment (B) and a transparent or translucent thermoplastic resin layer (C) laminated in the order mentioned.

The invention also provides the decorative sheet wherein the thermoplastic resin layer (A) and/or the transparent or translucent thermoplastic resin layer (C) have their respective surfaces disposed for direct contact with the adhesive layer (B) and having a pattern formed previously by printing with a printing ink.

The invention also provides the decorative sheet wherein the luster pigment has a particle diameter of 1–500 µm.

Further, the present invention provides a process for producing a decorative sheet, which comprises applying a luster pigment-containing adhesive on a surface of a transparent or translucent thermoplastic resin layer (C) to form an adhesive layer (B), and subsequently laminating a thermoplastic resin layer (A) on the adhesive layer (B).

Still further, the present invention provides a process for producing a decorative sheet, which comprises applying a luster pigment-containing adhesive on a surface of a thermoplastic resin layer (A) to form an adhesive layer (B), and subsequently laminating a transparent or translucent thermoplastic resin layer (C) on the adhesive layer (B).

Figure 1:
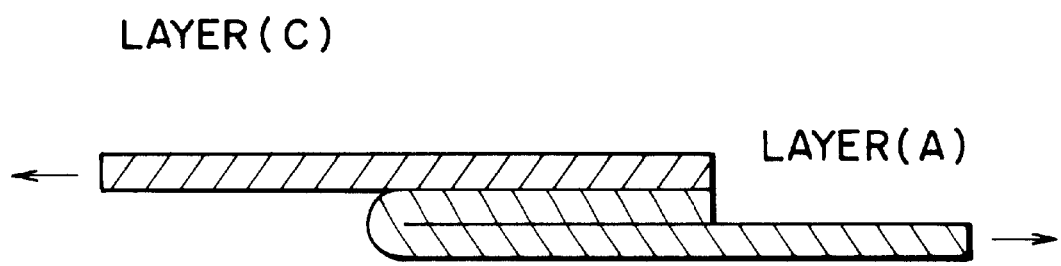
FIG. 1 is an explanatory view of the method of measuring adhesive strength used in the examples that will follow.

The present invention will now be described below in greater detail.

The invention is based upon a novel concept in which a luster pigment is incorporated in an adhesive layer to be disposed as an interlaminar layer. This concept ensures that a decorative sheet of noticeably enhanced designability be attained with only a limited amount of a luster pigment, and results in cost savings and a simplified production line.

The decorative sheet of the present invention will now be described with regard to each of its constituent layers.

(A) Thermoplastic Resin Layer

This thermoplastic resin layer (A) (hereinafter where relevant referred to simply as the layer (A)) is disposed for direct contact with a substrate and may be formed to be transparent or translucent according to the application of the resulting decorative sheet. The layer (A) fits well to those concavo-convex portions which may be present on the surface of a substrate, thereby allowing the decorative sheet to be structurally smooth. With addition of a suitable pigment, the layer (A) can also conceal adverse colors and the like on the substrate from external view where desired.

Suitable resins for the layer (A) are polyvinyl chloride type resins, and polyolefin type resins such as polypropylene, high-density polyethylene, low-density polyethylene, acrylonitrile-butadiene-styrene type resin and acrylonitrile-ethylene-styrene type resin.

When a polyvinyl chloride type resin (PVC) is chosen for the layer (A), the degree of polymerization of the resin should be preferably in the range of 700–1500. A plurality of PVCs of varying polymerization degrees can also be used in combination. In this case, a PVC having a polymerization degree of 700–1500 may be mixed in an amount larger than 50% by weight with the balance composed of a PVC having a polymerization degree defferent from the above specified range. Furthermore, plasticizers commonly known in the art may be utilized including for example, a phthalate type, a trimellitate type, a pyromellitate type, a polyester type, an epoxy type and a phosphorus type. The amount of plasticizer to be added may preferably be not more than 50 parts by weight based on 100 parts by weight of PVC. When desired, other known additives selected from, for example, reinforcing agents, modifiers, processing aids, ultraviolet absorbers and the like may also be used.

The above PVCs type may be those currently marketed and include, for example, R Type available from Riken Vinyl Industries Co, and a polyacrylic resin may be Acryprene from Mitsubishi Rayon Co and the like.

When polypropylene (PP) is chosen for the layer (A), from the standpoint of film formability and drawdown, the melt index (g/10 min, 230° C., 2.16 kg load) may preferably be in the range of 0.5–20.

In the case where high-density polyethylene is chosen for the layer (A), with regard to film formability and drawdown, the melt index (g/10 min, 190° C., 2.16 kg load) may preferably be in the range of 0.03–2.0.

When low-density polyethylene is chosen for the layer (A), with film formability and drawdown taken into account, the melt index (g/10 min, 190° C., 2.16 kg load) may preferably be in the range of 0.5–10.0.

When acrylonitrile-butadiene-styrene type resin is chosen for the layer (A), from the standpoint of film formability and drawdown, the melt index (g/10 min, 220° C., 10.00 kg load) may preferably be in the range of 3.0–30.0. Moreover, considering discoloration and chemical resistance, required during processing, an appropriate blend ratio of each of acrylonitrile-butadiene-styrene components may be set at 50–55/15–25/20–35, respectively.

The layer (A) can be formed by any known method, examples of which include calendering, extrusion, solation, casting and the like. Among the listed methods calendering, casting and extrusion are particularly preferred because they are economical and have good workability.

Various additives such as stabilizers, plasticizers, modifiers, fillers and the like may be incorporated in the layer (A) according to the intended use of the decorative sheet so that the elongation, impact resistance, weather resistance, aging resistance and the heat discoloration resistance of the resultant decorative sheet can be improved. When found desirable, selected pigments may also be added.

The thickness of the layer (A) is not particularly restricted, but can be selectively determined with regard to the intended function of the decorative sheet. In view of the handling properties of a decorative sheet at the final processing stage, or economic aspects, the layer (A) may have a thickness preferably of 20 μm–500 μm, more preferably of 50 μm–300 μm.

(C) Transparent or Translucent Thermoplastic Resin Layer

The transparent or translucent thermoplastic resin layer (C) (hereinafter where relevant referred to simply as the layer (C)) is useful for constituting an outer surface of the decorative sheet of the present invention and may be transparent or translucent. The term translucent used herein means a film or sheet having a transmission of parallel light of 30% or more as measured in accordance with ASTM D1003. Due to the arrangement of the layer (C), a luster pigment contained in an adhesive layer (B) increases color depth and can express, not a mere one-dimensional metallic tone, but a polyhedral design having sheens emitted from all associated angles.

The layer (C) can be formed from a polyester type resin, a polyvinyl chloride type resin, a polyethylene type resin, a polypropylene type resin, a polycarbonate type resin, a polyacrylic type resin, a polyurethane type resin, an ABS type resin, a polymethylpentene type resin, a polyfluorine type resin, a polyvinyl alcohol type resin and the like. Of the resins mentioned, a polyfluorine type resin such as polyethylene-tetrafluoroethylene, polyvinylidene fluoride and polyvinyl fluoride, and a polyester type resin are especially preferred. Such resins have an advantage in that after being made into a composite material, they exhibit good fabricability. A polyester type resin is most preferable. Eligible polyester type resins include ST Type, commercially available from Unitika Corp., and the like. Eligible polyvinyl chloride type resins may be DN Type from Riken Vinyl Industries Co. and the like.

Further, the above exemplified resins can be used in the form of a polymer alloy derived by blending two or more resins, or in the form of a multi-layered polymer structure obtained by coextruding two or more resins.

The layer (C) can be formed by any conventional method, examples of which include calendering, extrusion, solation, casting and the like. Among the listed methods, calendering and extrusion are especially preferable as they are rather economical and have good workability.

Various additives such as stabilizers, plasticizers, modifiers, fillers and the like may be incorporated in the layer (C) according to the intended use of the decorative sheet so that the elongation, impact resistance, weather resistance, aging resistance and the heat discoloration resistance of the resultant decorative sheet can be improved. Pigments may also be added when desired.

The transparency of the layer (C) should not be to such an extent as to cause a loss in the effect of a luster pigment contained in an underlying adhesive layer (B), or a loss in the effect of a print formed on a layer other than the layer (C). The transmission of parallel light (ASTM D1003) should be 30% or more, preferably more than 50%, more preferably in the range of 80–98%. The transmission of parallel light is measured with the thickness of the layer (C) set in the range of 25–100 μm, depending on the material used. For an acrylic type resin, the thickness is in the range of 25–50 μm, for a polyvinyl chloride type resin it is in the range of 50–100 μm and for polyester type resin it is in the range of 25–50 μm. If the transmission of parallel light does not exceed 30%, then the color tone, pattern, and the like of the luster pigment contained in an underlying layer and of the print become hidden from external view. Consequently, desired designability is unattainable.

The thickness of the layer (C) is not particularly limited, but is selectively determinable with regard to the intended function of a decorative sheet. Considering the mechanical strength of a decorative sheet and the handling convenience thereof at the final processing stage as well as designability aspects such as a metal-tone stereoscopic feeling (depth) and the like, the layer (C) may have a thickness preferably of 5 $\mu$m–250 $\mu$m, particularly of 10–250 $\mu$m, more preferably of 10 $\mu$m–150 $\mu$m, most preferably of 10–75 $\mu$m.

A continuous or discontinuous pattern formed by printing with an ink, namely a so called top print or back print can be provided on the respective surfaces of the layer (A) and/or the layer (C) disposed for direct contact with an adhesive layer (B) described later. Such a structure has an advantage in that it enables expression of a polyhedral design which, in cooperation with the corresponding metal substrate, arises from the print pattern. Inks used may be those obtained by kneading an inorganic or organic pigment, or a powdered metal into a vehicle such as of a vinyl, acrylic, polyester, urethane type or the like. Print patterns may be illustrated, for instance, wholly or partly on the surfaces of the layer (A) and/or the layer (C) in the shape of a wood, marble or sand grain, or an abstract mark, (B) Adhesive Layer The adhesive layer (B) (hereinafter where relevant simply referred to as layer (B)) is arranged to adhere to both the layer (A) and the layer (C) and is formulated to contain a luster pigment. The provision of this layer constitutes a particularly noteworthy feature of the present invention.

The layer (B) can be formed from an adhesive composed of a resin such as for example a polyester, vinyl chloride, vinyl acetate, polychloroprene, urethane, carboxylated rubber, thermoplastic SBR, acrylic, styrene, cellulose, polyamide or alkyd type, or an alloy type resin derived by combination of two or more resins of vinyl chloride, vinyl acetate and acrylic types. Of the resins illustrated here, polyester type resin and urethane type resin are especially preferable from the standpoint of adhesion, flowability and the like. The polyester type resin should preferably have a number average molecular weight of 500–25,000 from the standpoint of bondability, flowability and moldability. The urethane type resin should preferably have a number average molecular weight of 3,000–100,000 from the standpoint of bondability, flowability and durability.

More specifically, commercially available suitable resins include Adcoat manufactured by Toyo Morton Co. and Kanevilac manufactured by Kanegafuchi Chemical Industries Co. and the like.

The above adhesive components can be selected depending on the manner in which the layers (A) and (C) are combined together. For example, when the layer (A) is formed of polyethylene terephthalate and the layer (C) of polyvinyl chloride, an adhesive composed of polyester type resin or urethane type resin may be advantageously used. When the layer (A) is an acrylic type resin, an adhesive composed of a resin of a vinyl chloride, vinyl acetate or acrylic type may be employed.

As previously mentioned, the layer (B) must contain a luster pigment in order to achieve the objects of the present invention.

Luster pigments can be, for example, metallic luster pigments, specific examples of which include aluminum powder, brass powder, iron pigment, copper powder, silver pigment, gold pigment, mica, pearl essence pigment, pulverized deposited foil, glass filler and the like. They may also be used in combination. Among the pigments listed a pulverized deposited foil having a thickness of 1–3 $\mu$m and a particle diameter of 5–100 $\mu$m (1.0–2.8 specific gravity, preferably 1.0–1.4) is particularly preferred (A deposited foil obtained by depositing aluminum in the range of 0.01–10.0 Å in between two resin layers is further particularly preferred). In this case, when metallic toning or adhesion strength is considered, the deposited foil may be added in an amount of 0.01–10.0% by weight based on the weight of the adhesive component of the layer (B). The deposited foil may have, for example, of a scaly shape.

In the present invention, luster pigments of a larger particle diameter can be advantageously used. The particle diameter, for example, may be in a usual range of 1–500 $\mu$m, preferably 5–200 $\mu$m. Use of a luster pigment having a larger particle diameter enables light incident upon the resulting decorative sheet to emit irregular reflections in diverse directions, thus giving excellent designability to the sheet.

The proportion of the luster pigment to be added may be in the range of 0.01–200% by weight, preferably of 0.1–100% by weight, based on the weight of the adhesive component contained in the layer (B). As the propotion of the luster pigment increases, glossiness becomes greater and hence nearer to metallic toning. Conversely, however, the layer (B) becomes more susceptible to cohesive failure, eventually leading to reduced adhesion strength between the layers (A) and (C).

The thickness of the layer (B) may be determined depending on the adhesion strength matched with the intended application of a decorative sheet, the particle diameter of a luster pigment to be added, economic factors and the like. For example, when the particle diameter of the luster pigment is in the range of 5–200 $\mu$m, the thickness of the layer (B) should be preferably in the range of 5 $\mu$m–200 $\mu$m, more preferably of 8 $\mu$m–30 $\mu$m.

To gain metallic toning and designability of a deep character, the layer (B) may be preferably formed with a larger thickness.

A conventional coating technique can be used to form the layer (B). Examples include using a gravure coater, a reverse coater, a knife coater, a roll coater, a kiss-roll coater, an air doctor coater, a blade coater, a chast coater, a spray coater, a hot-melt coater, an extrusion coater, a curtain coater or the like. A coating technique using a knife coater or a roll coater is especially preferred.

When using a luster pigment having a particle diameter in the range of 5–100 $\mu$m, the clearance between the pair of rolls may be set to be 3–5 times the desired thickness of the layer (B) so that good results can be produced.

When a solvent layer is selected for the layer (B), a low solvent-resistant resin such as of a polyvinyl chloride or acrylic type may be used for the layer (A) by first coating the solvent type adhesive on a fluorine or polyester high solvent-resistant resin, and subsequently by transferring the resultant coat to the layer (A).

The layer (B) may contain, in addition to the luster pigment, other pigments and dyes each of an inorganic or organic nature as optional components according to the purpose or design of the resulting decorative sheet.

The decorative sheet of the present invention can be produced for example by disposing the layer (B) over the layer (C) by coating, followed by laminating the layer (A). To this end, pressure and heat may be applied as desired.

Conversely, the layer (B) may be disposed over the layer (A) as by coating, followed by laminating the layer (C).

When it is found necessary, an embossed pattern may be formed in a continuous or discontinuous concavo-convex shape on the layer (C) with an embossing roll or an embossing plate.

A principal feature of the present invention lies in the arrangement of an adhesive layer containing a luster pigment. This adhesive layer is formed with a small thickness so as to prevent cohesive failure. When a luster pigment is added to the adhesive layer in a uniform state and to an extent so as not to impair the adhesion strength of the layer, the amount of pigment to be used is reduced, but the adhesive layer together with the overlying transparent or translucent layer has an excellent deep metallic tone.

BEST MODE OF CARRYING OUT THE INVENTION

The present invention will be further described below with reference to several examples and comparative examples which are not to be construed as restrictive.

EXAMPLE 1

A decorative sheet according to the invention was produced by use of the layers given below.

(A) Thermoplastic resin layer: a colored plasticized polyvinyl chloride film 100 $\mu$m in thickness (R Type, FC 6937, product of Riken Vinyl Industries Co.).

(B) Adhesive layer: a composition in which 1 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting of the resulting laminate to length, and the particle diameter was in the range of about 28–44 $\mu$m.

(C) Transparent or translucent thermoplastic resin layer: a transparent polyester film 25 $\mu$m in thickness (S Type, transmission of parallel light 86%, product of Unitika Corp.).

The above layers were assembled into a decorative sheet of the invention in the following manner.

The layer (B) was applied with a dry coat thickness of 20 $\mu$m on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 2

A decorative sheet according to the invention was produced by use of the layers given below.

(A) Thermoplastic resin layer: a colored plasticized polyvinyl chloride film 100 $\mu$m in thickness (R Type, FC 6937, product of Riken Vinyl Industries Co.).

(B) Adhesive layer: a composition in which 3 parts by weight of a pulverized deposited foil was added per 100 parts by weight of a vinyl chloride-vinyl acetate copolymer adhesive (Kanevilac L-CK, polymerization degree 400/solvent MEK/toluene=1/1, product of Kanegafuchi Chemical Industries Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 44–78 $\mu$m.

(C) Transparent or translucent thermoplastic resin layer: a transparent acrylic film 50 $\mu$m in thickness (Acryprene, transmission of parallel light 91.8%, product of Mitsubishi Rayon Co.).

The above layers were assembled into a decorative sheet of the invention in the following manner.

The layer (B) was applied with a dry coat thickness of 20 $\mu$m on a transparent polyester film of 25 $\mu$m in thickness (S Type, product of Unitika Corp.) by means of a knife coater and then dried. Subsequently, the layer (A) was laminated on the resultant coated surface for 30 seconds with a hot lamination system and a heating roller of 150° C. The polyester film was then peeled, and the layer (C) was laminated for 30 seconds with a hot lamination system and with a heating roller of 150° C. in place of the polyester film, whereby a decorative sheet of the invention was obtained.

EXAMPLE 3

A decorative sheet according to the invention was produced by use of the layers given below.

(A) Thermoplastic resin layer: a colored plasticized polyvinyl chloride film 100 $\mu$m in thickness (R Type, FC 6937, product of Riken Vinyl Industries Co.).

(B) Adhesive layer: A composition in which 1 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 $\mu$m.

(C) Transparent or translucent thermoplastic resin layer: a transparent polyester film of 25 $\mu$m in thickness (S Type, transmission of parallel light 86%, product of Unitika Corp.).

The above layers were assembled into a decorative sheet of the invention in the following manner.

The layer (B) was applied with a dry coat thickness of 20 $\mu$m on the layer (C) by means of a knife coater and then dried. Subsequently, the layer (A) was laminated on the resultant coated surface with a dry lamination system and a heating roller of 150° C., whereby a decorative sheet of the invention was obtained In this case, an abstract mark was previously back-printed on one surface of the layer (C) on which the layer (B) is to be coated with a printing ink (Pearl Ink, for use with polyethylene terephthalate resins, product of Toyo Ink Co.) and was transferred on the layer (B).

EXAMPLE 4

A decorative sheet according to the invention was produced by use of the layers given below.

(A) Thermoplastic resin layer: a colored plasticized polyvinyl chloride film 100 $\mu$m in thickness (R Type, FC 6937, product of Riken Vinyl Industries Co.).

(B) Adhesive layer: a composition in which 1 part by weight of a titanium dioxide-covered powdered mica (Illiodine, product of Merck Japan Co.) was added per 100 parts by weight of a polyester-type two-pack adhesive (AD 590, product of Toyo Morton Co.). The particle diameter of the powdered mica was in the range of about 5–80 µm.

(C) Transparent or translucent thermoplastic resin layer: a transparent polyester film 25 µm in thickness (S Type, transmission of parallel light 86%, product of Unitika Corp.).

The above layers were assembled into a decorative sheet of the invention in the following way.

The layer (B) was applied with a dry coat thickness of 10 µm on the layer (C) by means of a knife coater and dried. Subsequently, the layer (A) was laminated on the resultant coated surface with a dry lamination system and a heating roller of 150° C., whereby a decorative sheet of the invention was obtained.

In this case, an abstract mark was previously back-printed on one surface of the layer (C) on which the layer (B) is to be coated with a printing ink (pearl Ink, for use with polyethylene terephthalate resins, product of Toyo Ink Co.) and was transferred on to the layer (B).

COMPARATIVE EXAMPLE 1

A decorative sheet as Comparative Example 1 was produced by use of the layers given below.

(A) Thermoplastic resin layer: a colored plasticized polyvinyl chloride film 100 µm in thickness (R Type, FC 6937, product of Riken Vinyl Industries Co.).

(B) Adhesive layer: a polyester-type two-pack adhesive (AD 590, product of Toyo Morton Co.).

(C) Transparent or translucent thermoplastic resin layer: a transparent polyester film 25 µm in thickness (S Type, transmission of parallel light 86%, product of Unitika Corp.).

The above layers were assembled into a decorative sheet of Comparative Example 1 in the following way.

The layer (B) was applied with a dry coat thickness of 4 µm on to the layer (C) by means of a gravure roll and dried. Subsequently, the layer (A) was laminated on the resultant coated surface with a dry lamination system and a heating roller of 150° C., whereby a decorative sheet of Comparative Example 1 was obtained.

In this case, an abstract mark was previously back-printed on one surface of the layer (C) on which the layer (B) is to be coated with a printing ink (Pearl Ink, for use with polyethylene terephthalate resins, product of Toyo Ink Co.) and was transferred on to the layer (B).

COMPARATIVE EXAMPLE 2

A decorative sheet as Comparative Example 2 was produced by use of the layers given below.

(A) Thermoplastic resin layer: a colored plasticized polyvinyl chloride film 100 µm in thickness (R Type, FC 6937, product of Riken Vinyl Industries Co.).

(B) Adhesive layer: a polyester-type two-pack adhesive (AD 590, product of Toyo Morton Co.).

(C) Transparent or translucent thermoplastic resin layer: a transparent polyester film 25 µm in thickness (S Type, transmission of parallel light 86%, product of Unitika Corp.).

The above layers were assembled into a decorative sheet of Comparative Example 2 in the following way.

The layer (B) was applied with a dry coat thickness of 4 µm on the layer (C) by means of a gravure roll and dried. Subsequently, the layer (A) was laminated on the resultant coated surface with a dry lamination system and a heating roller of 150° C., whereby a decorative sheet of Comparative Example 2 was obtained. In this case, an abstractive mark was previously top-printed on one surface of the layer (A) on which the layer (B) is to be coated with a printing ink (pearl Ink, for use with polyethylene terephthalate resins, product of Toyo Ink Co.).

EXAMPLE 5

A decorative sheet according to the invention was produced by use of the layers given below.

(A) Thermoplastic resin layer: a colored plasticized polyvinyl chloride film 100 µm in thickness (R Type, FC 6937, product of Riken Vinyl Industries Co.).

(B) Adhesive layer: a formulation in which 0.06 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 µm.

(C) Transparent or translucent thermoplastic resin layer: a transparent polyester film 25 µm in thickness (S Type, transmission of parallel light 86%, product of Unitika Corp.).

The above layers were assembled into a decorative sheet of the invention in the following way.

The layer (B) was applied with a dry coat thickness of 20 µm on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 6

A decorative sheet according to the invention was produced by use of the layers given below.

(A) Thermoplastic resin layer: a colored plasticized polyvinyl chloride film 100 µm in thickness (R Type, FC 6937, product of Riken Vinyl Industries Co.).

(B) Adhesive layer: a composition in which 2.0 parts by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting of the resulting laminate to length, and the particle diameter was in the range of about 28–44 µm.

(C) Transparent or translucent thermoplastic resin layer: a transparent polyester film 25 µm in thickness (S Type, transmission of parallel light 86%, product of Unitika Corp.).

The above layers were assembled into a decorative sheet of the invention in the following way.

The layer (B) was applied with a dry coat thickness of 20 µm on the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 7

A decorative sheet according to the invention was produced by use of the layers given below.

(A) Thermoplastic resin layer: a colored plasticized polyvinyl chloride film 100 μm in thickness (R Type, FC 6937, product of Riken Vinyl Industries Co.).

(B) Adhesive layer: a composition in which 6.0 parts by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 25 μm in thickness (S Type, transmission of parallel light 86%, product of Unitika Corp.).

The above layers were assembled into a decorative sheet of the invention in the following way.

The layer (B) was applied with a dry coat thickness of 20 μm on the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 8

A decorative sheet according to the invention was produced by use of the layers given below.

(A) Thermoplastic resin layer: a colored plasticized polyvinyl chloride film 100 μm in thickness (R Type, FC 6937, product of Riken Vinyl Industries Co.).

(B) Adhesive layer: a composition in which 0.006 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 25 μm in thickness (S Type, transmission of parallel light 86%, product of Unitika Corp.).

The above layers were assembled into a decorative sheet of the invention in the following way.

The layer (B) was applied with a dry coat thickness of 20 μm on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 9

A decorative sheet according to the invention was produced by use of the layers given below.

(A) Thermoplastic resin layer: a colored plasticized polyvinyl chloride film 100 μm in thickness R Type, FC 6937, product of Riken Vinyl Industries Co.).

(B) Adhesive layer: a composition in which 12.0 parts by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm. p1 (C) Transparent or translucent thermoplastic resin layer: a transparent polyester film 25 μm in thickness (S Type, transmission of parallel light 86%, product of Unitika Corp.).

The above layers were assembled into a decorative sheet of the invention in the following way.

The layer (B) was applied with a dry coat thickness of 20 μm on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 10

A decorative sheet according to the invention was produced by use of the layers given below.

(A) Thermoplastic resin layer: a colored plasticized polyvinyl chloride film 100 μm in thickness R Type, FC 6937, product of Riken Vinyl Industries Co.).

(B) Adhesive layer: a composition in which 1.0 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 12 μm in thickness (S Type, transmission of parallel light 86%, product of Unitika Corp.).

The above layers were assembled into a decorative sheet of the invention in the following way.

The layer (B) was applied with a dry coat thickness of 20 μm on the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 11

A decorative sheet according to the invention was produced by use of the layers given below.

(A) Thermoplastic resin layer: a colored plasticized polyvinyl chloride film 100 μm in thickness (R Type, FC 6937, product of Riken Vinyl Industries Co.).

(B) Adhesive layer: a composition in which 1.0 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 75 μm in thickness (S Type, transmission of parallel light 83%, product of Unitika Corp.).

The above layers were assembled into a decorative sheet of the invention in the following way.

The layer (B) was applied with a dry coat thickness of 20 μm on the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 12

A decorative sheet according to the invention was produced by use of the layers given below.

(A) Thermoplastic resin layer: a colored plasticized polyvinyl chloride film 100 μm in thickness (R Type, FC 6937, product of Riken Vinyl Industries Co.).

(B) Adhesive layer: a composition in which 1.0 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 100 μm in thickness (T Type, transmission of parallel light 87%, product of Unitika Corp.).

The above layers were assembled into a decorative sheet of the invention in the following way.

The layer (B) was applied with a dry coat thickness of 20 μm on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 13

A decorative sheet according to the invention was produced by use of the layers given below.

(A) Thermoplastic resin layer: a colored plasticized polyvinyl chloride film 100 μm in thickness (R Type, FC 6937, product of Riken Vinyl Industries Co.).

(B) Adhesive layer: a composition in which 1.0 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 9 μm in thickness (transmission of parallel light 86%, product of Unitika Corp.).

The above layers were assembled into a decorative sheet of the invention in the following way.

The layer (B) was applied with a dry coat thickness of 20 μm on to the layer (C) by means of a knife coater and then dried. Subsequently, the layer (A) was laminated on the resultant coated surface with a dry lamination system and a heating roller of 150° C., whereby a decorative sheet of the invention was obtained.

EXAMPLE 14

A decorative sheet according to the invention was produced by use of the layers given below.

(A) Thermoplastic resin layer: a colored plasticized polyvinyl chloride film 100 μm in thickness (OS Type, BR017, product of Riken Vinyl Industries Co.).

(B) Adhesive layer: a composition in which 1.0 part by weight of a pulverized deposited foil was added per 100 parts by weight of a polyester-type two-pack adhesive (AD 590, product of Toyo Morton Co.). The pulverized deposited foil used here was prepared by sandwiching an aluminum deposited film between a polyester substrate and a curable coat film to thereby form a three-layered laminate (LG, product of Oike Industries Co.), followed by cutting the resulting laminate to length, and the particle diameter was in the range of about 28–44 μm.

(C) Transparent or translucent thermoplastic resin layer: a transparent polyester film 25 μm in thickness (S Type, transmission of parallel light 86%, product of Unitika Corp.).

The above layers were assembled into a decorative sheet of the invention in the following way.

The layer (B) was applied with a dry coat thickness of 20 μm on the layer (C) by means of a knife coater and then dried. Subsequently, the layer (A) was laminated on the resultant coated surface with a dry lamination system and a heating roller of 150° C., whereby a decorative sheet of the invention was obtained.

In regard to the decorative sheets produced in the above examples and comparative examples, measurement was made of residual solvent, adhesion strength between layer (A) and layer (C) and elongation, testing of bondability between steel plate and decorative sheet and elongation, designability, opacifying ratio, color definition and pencil hardness value. The details of the associated measurement methods are indicated below.

Residual solvent: A gas chromatography head space method was used to measure the amount of solvent remaining in a decorative sheet.

measuring conditions:

temperature at which a sample was heated =150° C., 30 min carrier gas=nitrogen detector=nitrogen flame ionization detector (FID)

Adhesion strength between layer (A) and layer (C): JIS K6744 was followed. A specimen was prepared having a 1 inch wide and 7 inch long size and layers (A) and (C) were separated from each other at an edge portion, followed by folding the decorative sheet sample at an angle of 180 degrees as shown in FIG. 1. The resulting specimen was measured at a temperature of 23±2° C. and at a tensile speed of 100 mm/min.

Testing of bondability between decorative sheet and steel plate: The method stipulated by JIS K6744 was followed with slight modifications made. A specimen was prepared by applying an adhesive for use with steel plates (SC 611, product of Sony Chemical Corp.) with a dry coat thickness of 6 μm on a 0.6 mm thick, 200 mm wide and 300 mm long bonderized steel plate, drying the coated steel plate (40° C.×30 sec), and subsequently laminating a 200 mm wide and 300 mm long decorative sheet on the steel plate with heating at a plate temperature of 230° C.

The surface of the specimen thus prepared was cut at a spacing of 5 mm into a # (cell)-like shape such that both the covering layer and the adhesive layer were cut. A decorative sheet was thereafter laminated on the specimen by use of an Erichen test machine and drawn 6 mm at the opposite surface.

No change observed between the steel plate and the decorative sheet laminated thereon was graded as ○, slight release as Δ and full release as X.

Elongation: JIS K6734 was followed.

Designability: The decorative sheet produced was judged by visual inspection. In evaluating glossiness and depth, ⊚ refers to excellent, ○ to fair, Δ to inferior and×to bad.

Opacifying ratio: Measurement was made in accordance with JIS K5400. A specimen was prepared by applying a layer (B) with a dry coat thickness of 20 μm on a transparent polyester film (S Type, thickness 25 μm, transmission of parallel light 86%, product of Unitika Corp.) by use of a knife coater, followed by drying the coat film.

Regarding a test paper for measuring the opacifying ratio, ΔLw was taken to define a diffused reflection of an adhesive layer on a white side at an angle of between 45 and 0 degrees, whereas ΔLb was taken to define a diffused reflection of an adhesive layer on a black side at an angle of between 45 and 0 degrees. The opacifying ratio was calculated from the following equation.

opacifying ratio (%)=(ΔLb/ΔLw)×100

The measuring device used was a Spectrocolorimeter CM-2002 manufactured by Minolta Co.

Color definition: Measurement was made with a Portable Glossmeter PGD-4 manufactured by Japan Colors Laboratory.

Pencil hardness value: JIS K5400 was followed.

The results are shown in Table 1. The decorative sheets of the present invention proved to be not only highly satisfactory with respect to the various qualities tested, but also to have excellent designability.

TABLE 1

|  | Examples | | | | Comparative Examples | |
| --- | --- | --- | --- | --- | --- | --- |
|  | 1 | 2 | 3 | 4 | 1 | 2 |
| residual solvent (mg/m²) | ≦1.0 | 100 | ≦1.0 | ≦1.0 | ≦1.0 | 1000 |
| adhesive strength (kg/in.) | 1.6 | m.f. | 1.6 | 1.4 | 1.2 | 1.0 |
| bondability test | ○ | ○ | ○ | ○ | ○ | ○ |

TABLE 1-continued

| elongation (%) | | | | | | |
| --- | --- | --- | --- | --- | --- | --- |
| warpwise | 100 | 140 | 100 | 100 | 90 | 90 |
| weftwise | 70 | 150 | 70 | 70 | 70 | 70 |
| designability | ⊚ | ⊚ | ⊚ | ⊚ | X | X |
| opacifying ratio (%) | 94.9 | 99.6 | 94.9 | 70.1 | 57.9 | 57.9 |
| color definition | 0.8 | 0.8 | 0.8 | 0.8 | 0.8 | 0.8 |
| pencil hardness value | F | 2B | F | F | F | F |

|  | Examples | | | | |
| --- | --- | --- | --- | --- | --- |
|  | 5 | 6 | 7 | 8 | 9 |
| residual solvent (mg/m²) | ≦1.0 | ≦1.0 | ≦1.0 | ≦1.0 | ≦1.0 |
| adhesive strength (kg/in.) | 1.6 | 1.6 | 1.4 | 1.6 | m.f. |
| bondability test | ○ | ○ | ○ | ○ | ○ |
| elongation (%) | | | | | |
| warpwise | 100 | 100 | 100 | 100 | 100 |
| weftwise | 70 | 70 | 70 | 70 | 70 |
| designability | ⊚ | ⊚ | ⊚ | Δ | ⊚ |
| opacifying ratio (%) | 58.6 | 99.5 | 99.7 | 58.1 | 99.8 |
| color definition | 0.8 | 0.8 | 0.8 | 0.8 | 0.8 |
| pencil hardness value | F | F | F | F | F |

|  | Examples | | | | |
| --- | --- | --- | --- | --- | --- |
|  | 10 | 11 | 12 | 13 | 14 |
| residual solvent (mg/m²) | ≦1.0 | ≦1.0 | ≦1.0 | ≦1.0 | ≦1.0 |
| adhesive strength (kg/in.) | 1.6 | 1.6 | 0.3 | 1.6 | 1.2 |
| bondability test | ○ | Δ | Δ | ○ | ○ |
| elongation (%) | | | | | |
| warpwise | 100 | 100 | 100 | 100 | 100 |
| weftwise | 70 | 70 | 70 | 70 | 70 |
| designability | ⊚ | ⊚ | ⊚ | ⊚ | ⊚ |
| opacifying ratio (%) | 94.9 | 94.9 | 94.9 | 94.9 | 94.9 |
| color definition | 0.5 | 0.9 | 0.9 | 0.1< | 0.8 |
| pencil hardness value | 4B | H | 2H | 6B | B | elongation (%) warpwise: flow direction of film
weftwise: cross direction of film
m.f. of Example 2: material fracture of layer (C)
m.f. of Example 9: cohesive failure of layer (B)

Moreover, measurement of glossiness was made for the decorative sheets obtained in Example 3 and Comparative Example 1, respectively.

In this measurement, parallel light was made incident upon a sample, and light reflected therefrom was collected with an objective lens so that a magnified image of the sample was projected. Part of the magnified image was further collected by means of a photomultiplier, then the sample was moved to determine any variation in the amount of light collected. Testing was done using a Microglossmeter (MG-1) manufactured by Suga Test Machinery Manufacturing Co. as a measuring apparatus.

The amount of varied light collected is defined as the glossiness value (SE value), the greater this value is, the higher the glossiness is. The sample of Example 3 revealed a SE value of 5.2, while the sample of Comparative Example 1 had a SE value of 1.2. As is evident from these results, the decorative sheet of the present invention is capable of producing high glossiness.

INDUSTRIAL APPLICABILITY

In accordance with the present invention, a less costly, highly designable decorative sheet and a process for its production are provided.

What is claimed is:

1. A decorative sheet comprising a thermoplastic resin layer (A), an adhesive layer having a thickness of 8 to 30 μm and containing a luster pigment (B) and a transparent or translucent thermoplastic resin layer (C) laminated in the order mentioned, wherein the surface of the transparent or translucent thermoplastic resin layer (C) which is in contact with the adhesive layer (B) has a pattern formed by printing with a printing ink and wherein the particle diameter of the luster pigment is in a range of 1–500 μm and the proportion of the luster pigment is in a range of 0.1–100 wt % by weight based on the weight of the adhesive component contained in the adhesive layer (B).

2. A decorative sheet according to claim 1, wherein the surface of the thermoplastic resin layer (A) which is in contact with the adhesive layer (B) has a pattern formed by printing with a printing ink.

3. The decorative sheet according to claim 1, wherein the luster pigment has a particle diameter of 5–200 μm.

4. A process for producing the decorative sheet as claimed in claim 1, which comprises forming a pattern by printing with a printing ink on a surface of a transparent or translucent thermoplastic resin layer (C), applying a luster pigment-containing adhesive on a surface of the transparent or translucent thermoplastic resin layer (C) to form an adhesive layer (B), and subsequently laminating a thermoplastic resin layer (A) on the adhesive layer (B), wherein the printed surface of the transparent or translucent thermoplastic resin layer (C) is in contact with the adhesive layer (B).

5. A process for producing the decorative sheet as claimed in claim 1, which comprises forming a pattern by printing with a printing ink on a surface of a transparent or translucent thermoplastic resin layer (C), applying a luster pigment-containing adhesive on to a surface of a thermoplastic resin layer (A) to form an adhesive layer (B), and subsequently laminating the transparent or translucent thermoplastic resin layer (C) on the adhesive layer (B)

wherein the printed surface the transparent or translucent thermoplastic resin layer (C) is in contact with the adhesive layer (B).

6. A decorative sheet consisting essentially of a thermoplastic resin layer (A), an adhesive layer having a thickness of 8 to 30 μm and containing a luster pigment (B) and a transparent or translucent thermoplastic resin layer (C) laminated in the order mentioned, wherein the surface of the transparent or translucent thermoplastic resin layer (C) which is in contact with the adhesive layer (B) has a pattern formed by printing with a printing ink and wherein the particle diameter of the luster pigment is in a range of 1–500 μm and the proportion of the luster pigment is in a range of 0.1–100 wt % by weight based on the weight of the adhesive component contained in the adhesive layer (B).

7. The decorative sheet according to claim 6, wherein the luster pigment has a particle diameter of 5–200 μm.

8. A decorative sheet consisting of a thermoplastic resin layer (A), an adhesive layer having a thickness of 8 to 30 μm and containing a luster pigment (B) and a transparent or translucent thermoplastic resin layer (C) laminated in the order mentioned, wherein the surface of the transparent or translucent thermoplastic resin layer (C) which is in contact with the adhesive layer (B) has a pattern formed by printing with a printing ink and wherein the particle diameter of the luster pigment is in a range of 1–500 μm and the proportion of the luster pigment is in a range of 0.1–100 wt % by weight based on the weight of the adhesive component contained in the adhesive layer (B).

9. The decorative sheet according to claim 8, wherein the luster pigment has a particle diameter of 5–200 μm.

10. A process for producing the decorative sheet as claimed in claim 8, which comprises forming a pattern by printing with a printing ink on a surface of a transparent or translucent thermoplastic resin layer (C), applying a luster pigment-containing adhesive on a surface of the transparent or translucent thermoplastic resin layer (C) to form an adhesive layer (B), and subsequently laminating a thermoplastic resin layer (A) on the adhesive layer (B), wherein the printed surface of the transparent or translucent thermoplastic resin layer (C) is in contact with the adhesive layer (B).

11. A process for producing the decorative sheet as claimed in claim 8, which comprises forming a pattern by printing with a printing ink on a surface of a transparent or translucent thermoplastic resin layer (C), applying a luster pigment-containing adhesive on to a surface of a thermoplastic resin layer (A) to form an adhesive layer (B), and subsequently laminating the transparent or translucent thermoplastic resin layer (C) on the adhesive layer (B)

wherein the printed surface the transparent or translucent thermoplastic resin layer (C) is in contact with the adhesive layer (B).

* * * * *